(No Model.) 2 Sheets—Sheet 1.
F. A. WESSEL.
ALTERNATING CURRENT ELECTRIC MOTOR.
No. 503,183. Patented Aug. 15, 1893.
*Fig. 1.*
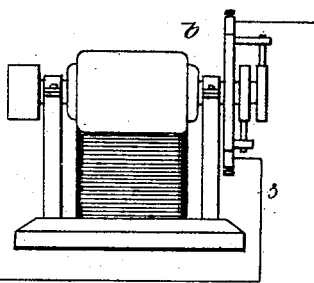
*Fig. 4.*
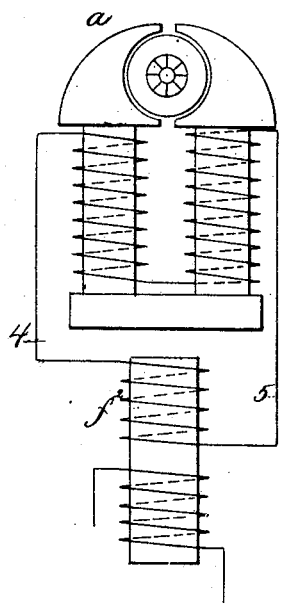
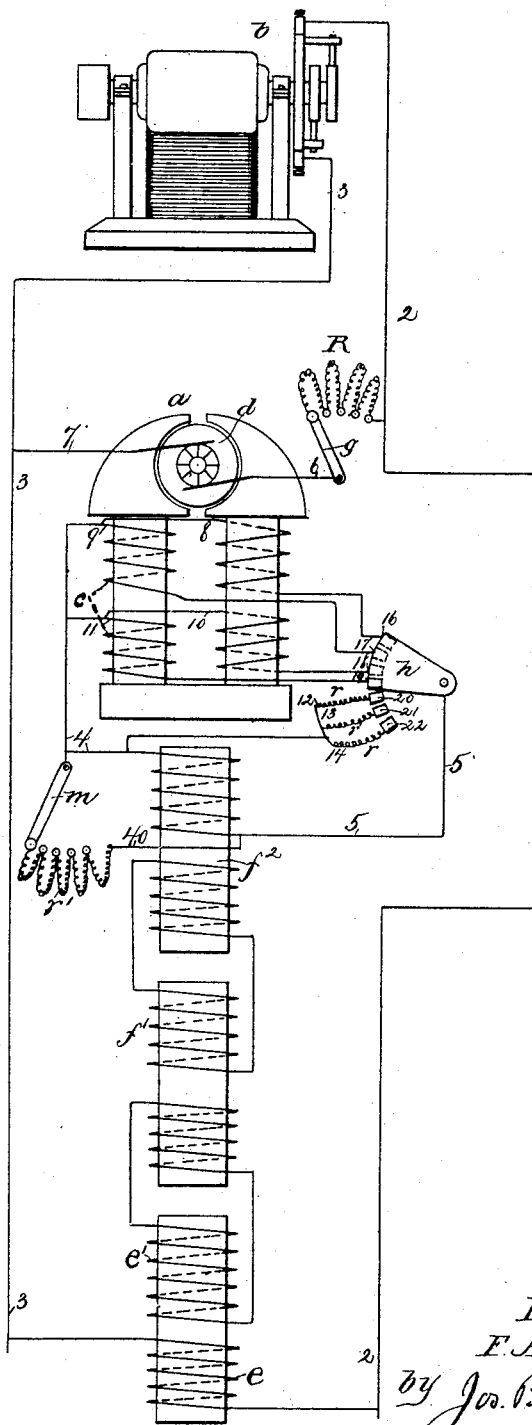
Witnesses
Jas. J. Maloney
H. J. Livermore
Inventor
F. A. Wessel
by Jos. P. Livermore
Att'y (No Model.) 2 Sheets—Sheet 2.
F. A. WESSEL.
ALTERNATING CURRENT ELECTRIC MOTOR.
No. 503,183. Patented Aug. 15, 1893.
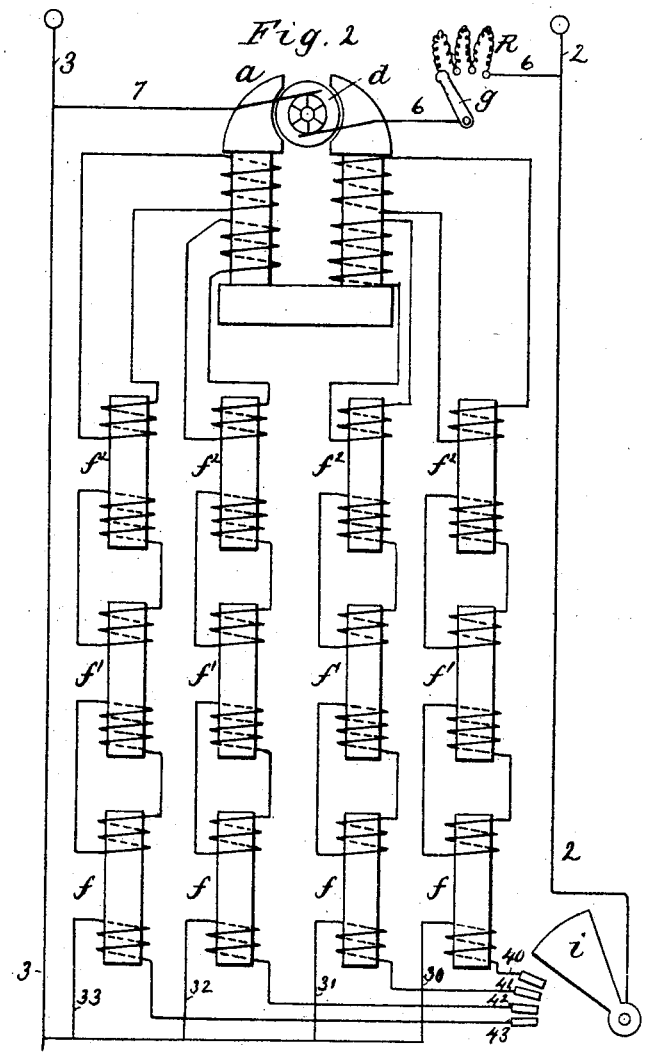
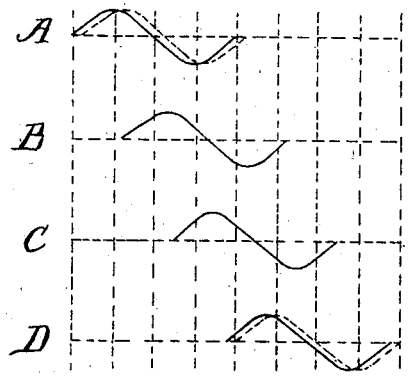
Witnesses
Jas. F. Maloney.
M. E. Hill.
Inventor,
F. A. Wessel
by Jos. P. Livermore
Att'y.

UNITED STATES PATENT OFFICE.

FERDINAND A. WESSEL, OF BOSTON, MASSACHUSETTS.

ALTERNATING-CURRENT ELECTRIC MOTOR.

SPECIFICATION forming part of Letters Patent No. 503,183, dated August 15, 1893.

Application filed April 3, 1888. Serial No. 269,477. (No model.)

*To all whom it may concern:*

Be it known that I, FERDINAND A. WESSEL, of Boston, county of Suffolk, State of Massachusetts, have invented an Improvement in Electromotors, (Alternating-Current,) of which the following description, in connection with the accompanying drawings, is a specification, like letters and figures on the drawings representing like parts.

My invention relates to electric apparatus operated by alternating electric currents and is mainly designed for application to electric motors.

The object of the invention is to obtain in the armature and field of the machine, respectively, alternations of current or magnetism of the proper or necessary relative phase required for producing the most efficient action on the apparatus, the machine being energized or excited as to both of its parts or elements from the same alternating current mains or wires directly or indirectly.

When an electric motor of any usual continuous current type is run by alternating currents, it is necessary to efficient action that the phases of the alternations of field magnetism and armature magnetism should, as nearly as possible, coincide, that is to say, the magnetism or the magnetic field produced by both the armature coils and the field coils should both reverse at the same instant. A difficulty, however, arises owing to the difference in self induction or retardation of the armature and field magnet, the alternations of magnetism of the field or its magnetization and demagnetization being retarded and in different and ordinarily greater degree than the alternations in the armature. This results in an interference or opposition of action which will be greater or less according to the differences in the self induction affecting the circuits or parts of the apparatus through which the electric and magnetic influences act to produce the magnetic field around the armature and the alternations of electric or magnetic condition in the armature itself in said field. The difficulty will be more readily understood by considering the case of a machine in which the alternations of current in the armature may be practically coincident with those of the line feeding the same, this condition, obviously, requiring that there should be practically no self-induction in the armature itself, or in other words that it should have little or no iron in it.

I have hereinafter described my invention as carried out in connection with a motor in which coincidence of alternations in the armature wire and in the mains or supply wires, from which they derive their alternations, is supposed to exist, but it will be obvious that slight variations from such coincidence are necessary, though I have for the purpose of simplifying the following description neglected such variations. In a motor of this construction it will result from the variance of phase in the field alternations and armature alternations that when, for instance, the electro motive force of the generator or feeding or supply line feeding the armature is nothing or in other words when the tendency to a production of a certain polarity in the armature is zero the field magnetism due to the field magnet of the motor will not yet fully reach the zero because the field magnet will not fully have lost its magnetism. In other words the waves of magnetism in the field are displaced in phase with relation to the alternations of the feeding current which tends to flow through the armature and while the armature current may be ready to reverse there will be, through the condition of the field, a tendency to the production in said armature of the current. The result is that the motor gives out current which has a tendency to stop the motor. It also follows from the conditions described that when the counter electro-motive-force of the motor armature becomes nothing, owing to the fact that the field magnetism has become zero, the electro-motive-force of the generator or feeding line will have attained some strength and a current will be forced through the armature which is wasted so that the motor does not fully utilize the current received.

My present invention consists essentially in a novel method of operating an alternating current apparatus in which two parts of the same require to have alternations of magnetism of certain relative phase, by feeding such parts directly or indirectly from a common alternating current supply wire and introducing an artificial or auxiliary lag between the alternating current supply wire or main and either or both parts of the apparatus, such lag or retardation being adjusted to bring about the desired relation of phase in the alternations of magnetism in the two parts. As applied to an electric motor fed from an alternating current main, my invention provides for bringing the times of maximum and minimum strength of the magnetic field of the motor into coincidence with the times of the maximum and minimum electro-motive-force of the current in the armature or the line supplying the same.

My invention consists further in the combinations of apparatus and circuits hereinafter described and more particularly specified in the claims.

I have herein illustrated my invention as carried out by interposing one or more converters between the field magnet coils and the current supplying circuit so that one or more additional retardations occur between the times of maximum and minimum electro-motive-force in the supplied current, and the times of maximum and minimum magnetic strength of the field magnet which retardations are sufficient to bring the maximum and minimum magnetic strength of the field magnets into coincidence with the times of maximum and minimum electro-motive-force, respectively, in the feeding line. For example if the retardation at each conversion amounts to about five sixteenths of a period representing all the different phases of the currents, then by converting three times with a retardation of about five sixteenths of a period each time, the moment of maximum electro-motive-force in the secondary of the last converter, will be brought one sixteenth of a period ahead of the next period of the current in the feeding line which will be sufficient to compensate for the retardation in changing the field magnetism that the phases of the magnetism in the field will be brought into coincidence with the phase of the electro-motive-force in the line, although in reality being a whole period later. Such coincidence of the phases of the magnetic field and electro-motive-force in the line or feed conductors causes the motor to operate efficiently.

The invention also consists in appliances for regulating the operation of the motor as will be described.

Figure 1 is a diagram illustrating an electro motor and appliances co-operating therewith for operating the said motor by alternating currents, in accordance with this invention. Fig. 2 is a similar diagram illustrating a modification of the means which may be employed for regulating the action of the motor. Fig. 3 is a diagram illustrating the relative times of the waves in the different portions of the apparatus, and Fig. 4 a modification to be referred to.

The dynamic motor $a$ may be of usual construction, such as used with a continuous current, preferably having its field magnet and armature of laminated construction, and has its armature connected by the usual commutator and brushes with the main line or feeding circuit 2, 3, which is supplied with an alternating current from a properly constructed dynamo $b$, or from a secondary generator or from any other known source of alternating current. Instead of having the coils $c$ of the field magnet of the motor $a$ connected directly with the leads 2, 3, either in series with the coil of the armature $d$ or in multiple arc therewith as is usually practiced, the said field magnet coil derives its current from the main leads 2, 3, indirectly as follows: The said leads 2, 3, are connected with the primary coil $e$ of an induction coil or converter $f$ the secondary coil $e'$ of which is connected with the primary of another converter $f'$, the secondary of which is connected with the primary of another converter $f^2$ and so on for as many conversions of the current as may be required, the secondary coil of the last converter being connected as shown at 4, 5, with the coils $c$ of the field magnet of the motor. The result of this manner of imparting the currents to the field magnets may be best understood from the diagram Fig. 3, in which the several phases of the electric and magnetic impulses are represented graphically in the usual manner, the vertical dotted lines representing coincident moments in the several diagrams.

In the diagram A the full line may represent the electro-motive force of the current in the lines and the dotted line the phases of the magnetic impulse which would be produced in the field magnet if acted upon directly by the said current, the said magnetic wave being about one-sixteenth of the entire period later than the wave of electro motive force owing to the retardation or lagging behind of the magnetic effect as is well known.

The diagram B represents the corresponding wave produced in the secondary of the first converter $f$ which is between the limits of one-quarter and one-half of a period later than the wave of electro motive force of diagram A, as is well known, and may for illustration be assumed in this case to be five-sixteenths of a period later as shown.

The diagram at C represents the electro-motive force wave of the secondary of the second converter $f'$ which may also be assumed to be five-sixteenths of a period later than the wave represented in diagram B and consequently ten-sixteenths later than the electro-motive force wave of diagram A.

Diagram D represents in full lines the electro-motive force wave of the secondary of the third converter $f^2$ which is also assumed to be five-sixteenths of a period later than that of diagram C and consequently fifteen-sixteenths of a period later than the electro-motive force wave of diagram A, and the wave shown in dotted lines diagram D represents the phases of the magnetic impulses produced in the field magnet by the current wave having the electro-motive force represented in diagram D which magnetic wave is about a sixteenth of a period later than the electromotive force wave and is thus brought into coincidence with the next wave after the full line wave of diagram A that represents the electro-motive force in the main line passing directly to the armature. These times are assumed merely for the purpose of illustration and are not necessarily the exact times that would be occupied by the several impulses in actual practice, but show that by the employment of a number of converters between the main current supplying leads and the field magnet coils, the magnetic impulses can be brought into unison with the current impulses so that the motor will operate efficiently with an alternating current. Any of the usual accessory devices may be employed for making the connections between the motor and the supplying circuit, and for regulating the action of the motor.

As shown in Figs. 1 and 2 a switch $g$ is included in the branch 6, 7, by which the armature of the motor is connected with the main leads, the said switch gradually removing resistance R from said branch circuit so as to apply the current gradually to the armature.

When there is no need of providing for varying the currents in the field magnets the terminals 5, 6, of the secondary coil of the last converter may be connected directly with the terminals of the coils of the field magnet, as shown in Fig. 4, but when it is desired to vary the field for the purpose of regulating the speed of the motor the field magnet may be provided with a number of coils one terminal of each of which may be connected as shown at 8, 9, 10, 11, with one terminal 4 of the secondary of the last converter which also has connected with it a number of branches 12, 13, 14 which include resistance coils $r$ each of which may be about equal in its action to a corresponding coil of the field magnets. The other terminals of the coils of the field magnet are connected as shown at 16, 17, 18, 19, with a number of contacts placed beside a number of contacts 20, 21, 22 forming the terminals of the resistance branches 12, 13, 14. A switch $h$ is connected with the other terminal 5 of the secondary of the last converter, said switch having a contact surface arranged to bear on four of the contact terminals simultaneously. Thus if the switch $h$ is on the contacts 19 to 22, the field magnet coil between 11 and 19, and all of the resistance branches will be in circuit with the secondary of the last converter. By moving the switch toward the contact 16, more of the field magnet coils will be brought in circuit and just as many of the resistance coils will be removed from circuit until finally all the field magnet coils are in, and all the resistance coils are out of circuit. This action may be reversed as required, and the magnetism of the field thus changed to vary the speed of the motor as required. In the arrangement shown in Fig. 2 a number of sets of converters $f$, $f'$, $f^2$, are employed, the secondary of the last converter of each set being connected with a coil of the field magnet as shown. The terminals 30, 31, 32, 33, of the primary coils of the first converters of each set are connected with one of the main leads 3 and the other terminals 40, 41, 42, 43, of the said primaries are respectively connected with a number of contacts for a switch $i$ connected with the other main lead 2, the said switch being adapted to make connection with all the said contacts simultaneously or with any number less than the whole. Thus if said switch be placed on the first contact, only one set of converters will be placed in circuit, and one coil of the field magnet will be supplied with current.

If the switch is on two contacts, two sets of converters will be in circuit and two field magnet coils supplied, and so on until all the sets of converters are in circuit and all coils of the field magnet receive current and contribute to the magnetization of the field.

The invention is not limited to any number of converters, as the number may be varied in accordance with the difference in the time between the phases of the actuating alternating current and of the magnetic impulses produced thereby.

The amount of retardation of the phases of the magnetization of the field, with a given number of converters interposed between the field magnet coils and the main feeding circuit, can be somewhat varied by the appliances shown in Fig. 1 consisting of a branch 40 interposed between the terminals 4, 5, of the secondary of the last converter and thus being in multiple arc with the field magnet coils. The said branch contains variable resistance such for example as the coils $r'$ having contacts between the different coils and the co-operating switch $m$ that may be moved to vary the resistance in the branch or derived circuit 40 and thus vary the load on the converters which will produce variations in the lagging or retardation of the current at each conversion.

It is obvious that the time of the current phases in the armature might be varied by the use of converters between the main line and the armature instead of between the main line and field magnet coils, or connectors might be used in both places but it is thought that the most desirable plan is to use them between the main line and field magnet coils as shown.

I claim—

1. In a non-synchronous alternating current motor the combination with the main leads for supplying an alternating current, of an electric motor having an armature connected with said leads, and one or more induction coils or converters having a primary coil connected with the main leads, and a secondary coil connected with and supplying alternating currents continually to the field magnet coil of the motor and adjusted as described so as to alternate the polarity of each pole thereof, synchronously with the alternations of the armature substantially as described.

2. The combination with the main leads for supplying an alternating current, of an electric motor having a continuous current armature and commutator therefor of any usual type supplied with alternating current from said leads, an alternating field magnet for said motor energized by said main and having its coils in a circuit separate from the armature, and one or more induction coils or converters having a primary coil connected with the main leads and a secondary connected with the coil of a field magnet, and adjusted as described to cause alternations synchronous with those of the armature as and for the purpose described.

3. The combination with an electric motor of the continuous current type, of a connection through the armature from an alternating supply wire or source, a separate field energizing circuit in which the alternations coincide with those of the supply wire, and intermediate retarding or lagging devices between the same and the field coil adjusted as described to bring the alternations of field magnetism into practical coincidence with the alternations in the armature.

4. The combination with an electric motor of the continuous current type, of a field and armature therefor fed from separate or independent alternating current branches taken from main supply wires, and auxiliary means connected to one of said branches for retarding the phases of the alternations to bring the field and armature alternations into coincidence, as and for the purpose described.

5. In an alternating electric motor having its armature and field energized by separate connections taken from alternating current wires or mains, the herein described method of bringing the times of maximum and minimum strength of the field magnetism into coincidence with the times of maximum and minimum electro-motive-force in the armature, consisting in lagging or retarding the alternations taken from the mains to excite the machine in proper amount to produce the desired coincidence of effect in the two parts of the machine, as and for the purpose described.

6. The herein described method of obtaining two sets of alternations of magnetism or current of the desired relation of phase, consisting in producing such alternations directly or indirectly from a common alternating source, and introducing an artificial or auxiliary lag between the alternating source or supply wire and the final circuit or device, adjusted, as described, to bring about the desired phase relation, as and for the purpose described.

7. The main line or leads for supplying an alternating current and an electro motor having its armature connected directly with said leads; a converter or induction coil having its primary coil connected with the said leads and a secondary with the primary of another converter, the secondary of which is connected with another, and so on, the secondary of the last converter of the set having one terminal divided into a number of branches connected with portions of the coil of the field magnet of the motor and with other branches containing resistance, and its other terminal connected within a switch which completes the connection with a portion of said branches, substantially as and for the purpose described.

In testimony whereof I have signed my name to this specification in the presence of two subscribing witnesses.

FERDINAND A. WESSEL.

Witnesses:
JOS. P. LIVERMORE,
JAS. J. MALONEY.